(12) United States Patent
Vilou

(10) Patent No.: US 6,526,931 B1
(45) Date of Patent: Mar. 4, 2003

(54) METHOD AND SYSTEMS FOR THE AUTOMATIC CONTROL OF THE CUTTING OFF AND RESTARTING OF THE THERMAL ENGINE OF A VEHICLE DURING TEMPORARY IMMOBILIZATIONS THEREOF

(75) Inventor: Gérard Vilou, Tassin la Demi Lune (FR)

(73) Assignee: Valeo Equipments Electriques Moteur, Creteil (FR)

( * ) Notice: Subject to any disclaimer, the term of this patent is extended or adjusted under 35 U.S.C. 154(b) by 0 days.

(21) Appl. No.: 09/605,865

(22) Filed: Jun. 29, 2000

(30) Foreign Application Priority Data

Jun. 30, 1999 (FR) .............................. 99 08531

(51) Int. Cl.[7] .......................... F02D 29/02; F02D 17/04
(52) U.S. Cl. .................................................. 123/179.4
(58) Field of Search ...................... 123/179.2, 179.3, 123/179.4, 198 D, 198 DC

(56) References Cited

U.S. PATENT DOCUMENTS

| 4,192,279 | A | * | 3/1980 | Maisch et al. | 123/198 DC |
|---|---|---|---|---|---|
| 4,362,133 | A | * | 12/1982 | Malik | 123/179.4 |
| 4,364,343 | A | * | 12/1982 | Malik | 123/179.4 |
| 4,494,497 | A | * | 1/1985 | Uchida et al. | 123/179.4 |
| 4,510,396 | A | * | 4/1985 | Uchida et al. | 123/179.4 |
| 5,072,703 | A | * | 12/1991 | Sutton | 123/179.4 |
| 5,222,469 | A | * | 6/1993 | Sutton | 123/198 DC |

FOREIGN PATENT DOCUMENTS

WO    9814702    4/1998

OTHER PUBLICATIONS

Japanese Patent Abstract, Pub. No. 58140434, Pub. Date Aug. 20, 1983.

* cited by examiner

Primary Examiner—Willis R. Wolfe
Assistant Examiner—Arnold Castro

(57) ABSTRACT

Method for controlling the thermal engine of a motor vehicle according to which the said thermal engine is cut off and automatically restarted at the beginning and end of temporary immobilisation periods, according to which the automatic cutting off of the thermal engine is inhibited when the vehicle battery is discharged below a given inhibition threshold, characterised in that the thermal engine is automatically restarted when the vehicle battery is discharged below the said inhibition threshold.

7 Claims, 1 Drawing Sheet

METHOD AND SYSTEMS FOR THE AUTOMATIC CONTROL OF THE CUTTING OFF AND RESTARTING OF THE THERMAL ENGINE OF A VEHICLE DURING TEMPORARY IMMOBILIZATIONS THEREOF

The present invention relates to the methods and systems for the automatic control of the cutting off and restarting of the thermal engine of a vehicle during temporary immobilisations of the latter.

Such an automatic control, conventionally referred to as "stop and go" according to the English terminology used by persons skilled in the art, consists of stopping the thermal engine during temporary immobilisations of the vehicle, such as for example at a red light or a level crossing, or in traffic bottlenecks.

One possible control consists of automatically stopping the thermal engine when the vehicle has been at rest for a certain amount of time, whilst the gearbox is in neutral and the accelerator and clutch are in the idle position, and then automatically restarting the thermal engine when the driver presses on the accelerator or brake pedal, or changes to a gear ratio other than neutral.

During these more or less long periods during which the thermal engine is temporarily stopped, the alternator does not rotate and the battery discharges to a greater or lesser extent according to the current consumption in the various vehicle circuits.

Because of this, in the case of difficult road traffic, or in the case of high electrical consumption, the battery may reach a discharge level such that restarting is no longer possible.

The vehicle is then broken down.

To limit this risk, the known solutions consist of using batteries of higher capacity in order to increase the reserve of electrical energy or to use a higher-power alternator in order to recharge the battery more rapidly during the periods of operation of the engine.

The result is an enhancement of the electrical equipment and significant extra costs.

To this end, a method has been proposed, in the document WO 98/14702, for controlling the thermal engine of a motor vehicle according to which the thermal engine is cut off and automatically restarted at the beginning and end of periods of temporary immobilization, and according to which the automatic cutting off of the thermal engine is inhibited when the vehicle battery is discharged below a given inhibition threshold.

It may be desirable to reduce the power of the battery and alternator even further.

The object of the present invention is to meet this requirement simply and economically.

According to the invention a method of the type indicated above is characterised in that the thermal engine is restarted automatically when the battery is discharged below the inhibition threshold.

Thus recharging of the battery occurs even when the vehicle is waiting at a light.

This arrangement makes it possible not to oversize the battery and therefore the alternator which recharges the battery.

Thus, in the case where the engine is stopped, the gearbox being in neutral and the clutch pedal idle, whilst the ignition key is in the operating position, an instruction to restart the engine is issued in order to recharge the battery if a measurement of the battery voltage indicates a voltage below a threshold.

In the case where the engine is running, the instruction to stop the engine is ignored when the battery voltage measured is below the said threshold.

The risks of breakdown are therefore prevented.

The invention is advantageously supplemented by the following different characteristics, taken alone or according to all possible technical combinations thereof:

- inhibition of the automatic cutting off of the thermal engine is cancelled when the battery charge level is above a given threshold greater than or equal to the inhibition threshold;
- the battery charge level is characterised by the voltage thereof measured periodically, when the thermal engine is not operating;
- the battery charge level is characterised by the drop in voltage of the battery when the starter is activated and before the electric motor thereof is actuated;
- the battery charge level is characterised by the voltage drop in the battery when the electric motor of the starter is rotated;
- the battery charge level is characterised by the average voltage drop during the driving of the thermal engine by the electric motor of the starter;
- the battery charge level is characterised by the speed of driving of the starter.

The invention also proposes a system for controlling the thermal engine of a motor vehicle having means for detecting the start and end of temporary immobilisation periods and for cutting off and automatically restarting the said thermal engine when the start or end of such a period is detected, characterised in that it has means for implementing such a method.

Other characteristics and advantages of the invention will also emerge from the following description. This description is purely illustrative and non-limitative. It must be read with regard to the accompanying single figure which depicts a flow diagram of a command in accordance with one possible embodiment of the invention.

Figure 1:
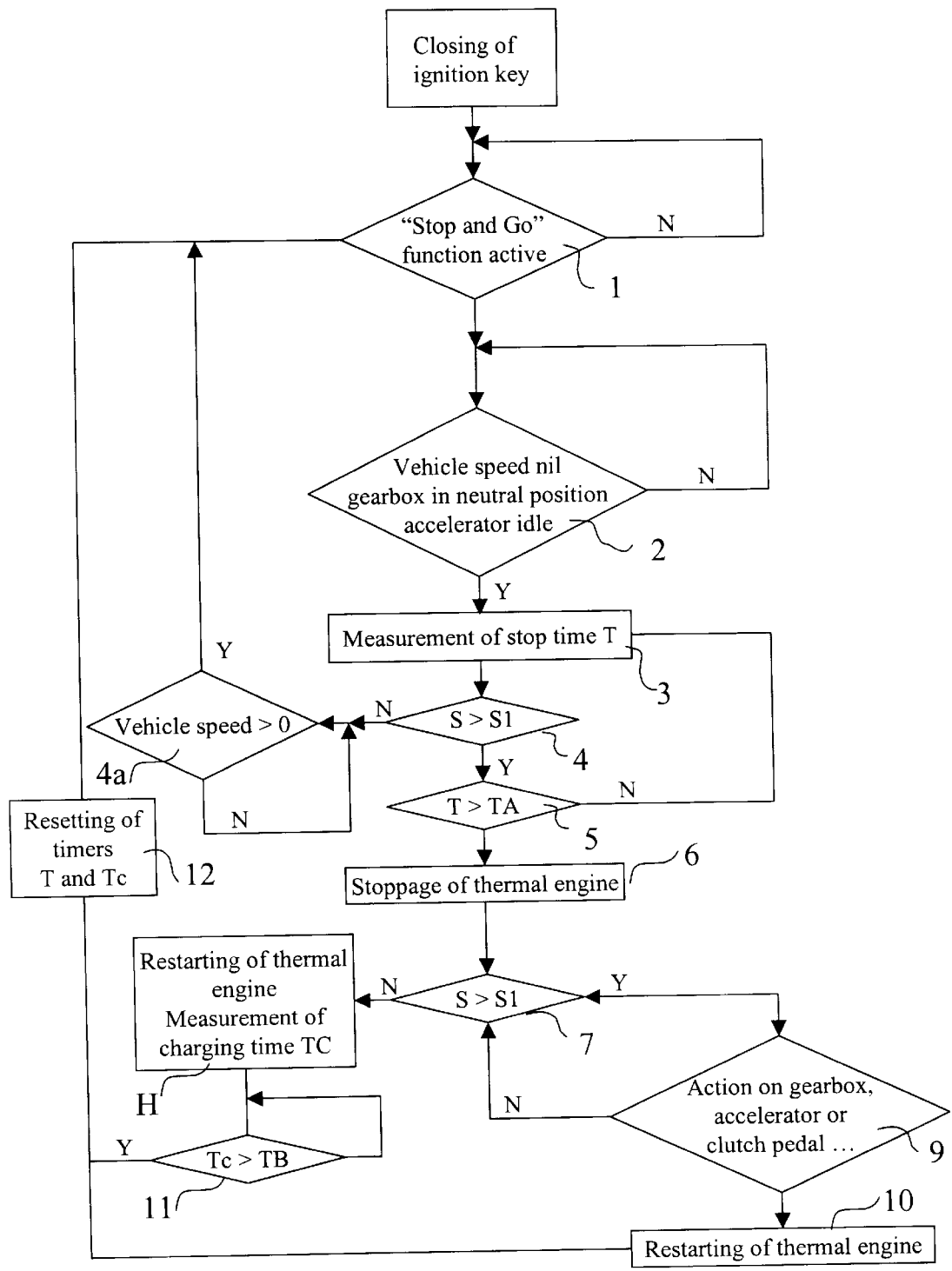
FIG. 1 depicts a flow diagram of a command in accordance with one possible embodiment of the invention.

As illustrated in this figure, when the ignition key or switch of the vehicle is closed, a test 1 is implemented, consisting of checking whether or not the "automatic cut off and restarting" function is active. Activation is for example triggered by the fact that the driver presses a selection button dedicated to this function on the dashboard.

When the thermal engine is started, this test is repeated regularly so that the processing corresponding to the automatic cut off and restarting command can take place as soon as the driver has pressed on the selection button.

When the automatic cut off and restarting function is activated, different criteria intended to trigger the stopping of the vehicle are checked at the end of the test step 1, in a test step 2. For example, it is checked whether the speed of the vehicle is zero, if the gearbox is in the neutral position and if the accelerator is idle.

This test 2 is repeated regularly.

If these different criteria are verified, the time T elapsed since the vehicle was at rest (step 3) is measured, and then it is checked whether or not the battery charge level—which is for example the battery voltage measured periodically, except during the period of operation of the starter—is greater than a threshold S1 which characterises a discharge threshold below which the vehicle battery must not fall (test 4).

If the discharge level is reached, that is to say if S is lower than S1, then the thermal engine is not cut off whatever the time during which the vehicle remains at rest.

The processing is resumed as from test step 1 as soon as the vehicle restarts or as soon as the voltage S becomes greater than a second given threshold S2 (step 4a). This threshold S2 is for example greater than or equal to the threshold S1.

On the other hand, if the discharge level is not reached, that is to say if S is greater than S1, the method checks whether or not the stoppage time T is greater than a time TA (test 5).

When the time T is greater than the time TA, the thermal engine is stopped (step 6).

It is then once again checked, in a step 7, that the discharge level has not been reached.

If the discharge level has been reached, the thermal engine is restarted in a step 8 in order to recharge the battery for a time TB. The automatic cut off/restarting system is neutralised at step 11 throughout the period TB. The engine having restarted, the driver can use his vehicle normally, apart from the "stop and go" function.

TB is a predetermined time, generally between 5 and 30 minutes. This neutralisation phase can optionally be inhibited by the detection of a charging current below a certain value, meaning that the battery has regained an acceptable charge level.

At the end of this period TB, the timers are reset to zero, and then the processing resumes as from step 1.

On the other hand, if the discharge level has not been reached, it is then checked, in a step 9, whether the restarting criterion or criteria are fulfilled. For example, it is checked whether the driver is exerting an action on the gearbox, accelerator or clutch pedal.

If such an action is detected, then the thermal engine is restarted (step 10) and the processing resumes as from step 1.

On the other hand, as long as the restarting criterion or criteria are not verified, the processing resumes as from the discharge level test of step 7.

As will have been understood, with the processing which has just been described, the automatic cut off and restarting function is inhibited as soon as the battery voltage passes below a given discharge level.

Parameters other than the voltage of the battery can be used to characterise its charge/discharge level.

Another possible parameter is for example the voltage drop measured at the terminals of the battery at the beginning of the last start-up of the starter motor.

This is because, when the battery discharges, its internal resistance increases.

And when the starter is activated, initially, only the contactor winding is powered; the result is an increase in the output of the battery compared with the one which existed before starting. This increase in current is essentially a function of the resistance of the starter winding. The variation in voltage dU which results therefrom on the vehicle electrical system is a function of the internal resistance of the battery, and therefore its state of charge.

The automatic cut off and restarting function is then inhibited as soon as this variation in voltage dU is less than a given threshold dU1.

As a variant again, it is possible to use the voltage drop during the operation of the starter as a parameter characterising the charge/discharge level of the battery.

When the electric motor of the starter starts up, a new voltage drop appears, higher when only the contactor winding is powered, and therefore easier to characterise. It is thus possible to use, as a parameter characterising the charge/discharge level of the battery, a measurement of the instantaneous voltage drop when the motor is powered (a peak current surge at the start of rotation of the rotor of the electric motor), or the mean voltage drop during the driving of the thermal engine.

There too, the automatic cut off and restarting function is inhibited as soon as this voltage drop becomes lower than a given threshold.

According to yet another variant, the charge or discharge of the battery can be characterised by a measurement of the speed of driving during the starting.

When the battery discharges, the speed of driving of the starter is lower. Below a certain speed level No, specific to each class of thermal engine, starting becomes no longer possible.

This makes it possible to define a speed threshold N1, close to the limit No, but higher than it, below which the automatic cut off/restarting function is inhibited. It is also possible to define a threshold N2 greater than or equal to N1 such that the inhibition is cancelled when the speed passes above the said threshold N2.

This measurement of speed is made either by an independent sensor on the flywheel at the end of the crankshaft, or by the sensor and its measuring module already used by the motor control, or by measuring the frequency or duration of the voltage or current oscillations caused by the compressions and decompressions of the thermal engine before it is started.

As will have been understood, the different variant processings which have just been described can for example be implemented by a management unit, such as a microprocessor, connected to the input of different sensors for measuring the parameter characterising the battery charge level and for detecting the start or end of a temporary immobilisation period and controlling at the output on the one hand the thermal engine injection means and on the other hand the starter.

As a variant the starter can also constitute an alternator, as described for example in the document FR-A-2 782 355.

What is claimed is:

1. Method for controlling a thermal engine of a motor vehicle according to which said thermal engine is cut off and automatically restarted at a beginning and an end of temporary immobilization periods, according to which automatic cutting off of the thermal engine is inhibited when a vehicle battery is discharged below a given inhibition threshold, according to which the thermal engine is automatically restarted when the vehicle battery is discharged below said inhibition threshold, wherein a battery charge level is characterized by a vehicle battery voltage drop measured at the beginning of the last start-up of the starter motor.

2. Method according to claim 1, wherein inhibition of the automatic cutting off of the thermal engine is cancelled when a battery charge level is above a given threshold greater than or equal to the inhibition threshold.

3. Method according to claim 1, wherein a battery charge level has a voltage drop in the battery measured when a starter is actuated and before an electric motor thereof is started up.

4. A method according to claim 3, wherein the battery charge level is characterized by a measurement of the instantaneous voltage drop when the electrical motor is powered.

5. Method according to claim 1, wherein a battery charge level has a voltage drop in the battery measured when an electric motor of a starter is rotated.

6. Method according to claim 5, wherein the battery charge level is characterized by a mean voltage drop during driving of a thermal engine by an electric motor of a starter.

7. System for controlling a thermal engine of a motor vehicle having means for detecting a start and end of temporary immobilization periods and for cutting off and automatically restarting said, thermal engine when at least one of the start and end of such a period is detected, comprising means for implementing the method according to claim 1.

* * * * *